US006369484B1

(12) United States Patent
Kageyama et al.

(10) Patent No.: US 6,369,484 B1
(45) Date of Patent: Apr. 9, 2002

(54) COMMUTATOR OF ROTARY ELECTRIC MACHINE AND METHOD OF MANUFACTURING THE SAME

(75) Inventors: Ryohei Kageyama, Hamamatsu; Kengo Ozawa; Tsuyoshi Kuribayashi, both of Toyohashi, all of (JP)

(73) Assignee: ASMO Co., Ltd., Shizuoka (JP)

( * ) Notice: Subject to any disclaimer, the term of this patent is extended or adjusted under 35 U.S.C. 154(b) by 0 days.

(21) Appl. No.: 09/422,035

(22) Filed: Oct. 20, 1999

(30) Foreign Application Priority Data

Nov. 12, 1998 (JP) .......................................... 10-322102

(51) Int. Cl.[7] ........................ H02K 13/00; H01R 39/16; H01R 39/52

(52) U.S. Cl. ....................... 310/233; 310/234; 310/235; 310/236

(58) Field of Search ................................ 310/233, 235, 310/236, 237; 29/596–597; 200/DIG. 6, DIG. 7

(56) References Cited

U.S. PATENT DOCUMENTS

| | | | | | |
|---|---|---|---|---|---|
| 3,987,539 | A | | 10/1976 | Grsvener | 29/597 |
| 4,598,463 | A | * | 7/1986 | Gerlach et al. | 29/597 |
| 5,003,212 | A | * | 3/1991 | Ibe et al. | 310/235 |
| 5,124,609 | A | * | 6/1992 | Nagasaka | 310/233 |
| 5,204,574 | A | * | 4/1993 | Kanno et al. | 310/233 |
| 5,491,373 | A | * | 2/1996 | Cooper et al. | 310/235 |

* cited by examiner

*Primary Examiner*—Tran Nguyen
(74) *Attorney, Agent, or Firm*—Fish & Richardson, P.C.

(57) ABSTRACT

In a commutator of a rotary electric machine having a plurality of commutator segments and a cylindrical insulation body, each of the commutator segments has a pair of inner claws disposed at axially central portion of an inner surface of the commutator segment respectively extending radially and axially inward and a pair of wedge portions disposed axially outside and a circumferential side of the pair of inner claws.

12 Claims, 14 Drawing Sheets

FIG. 6
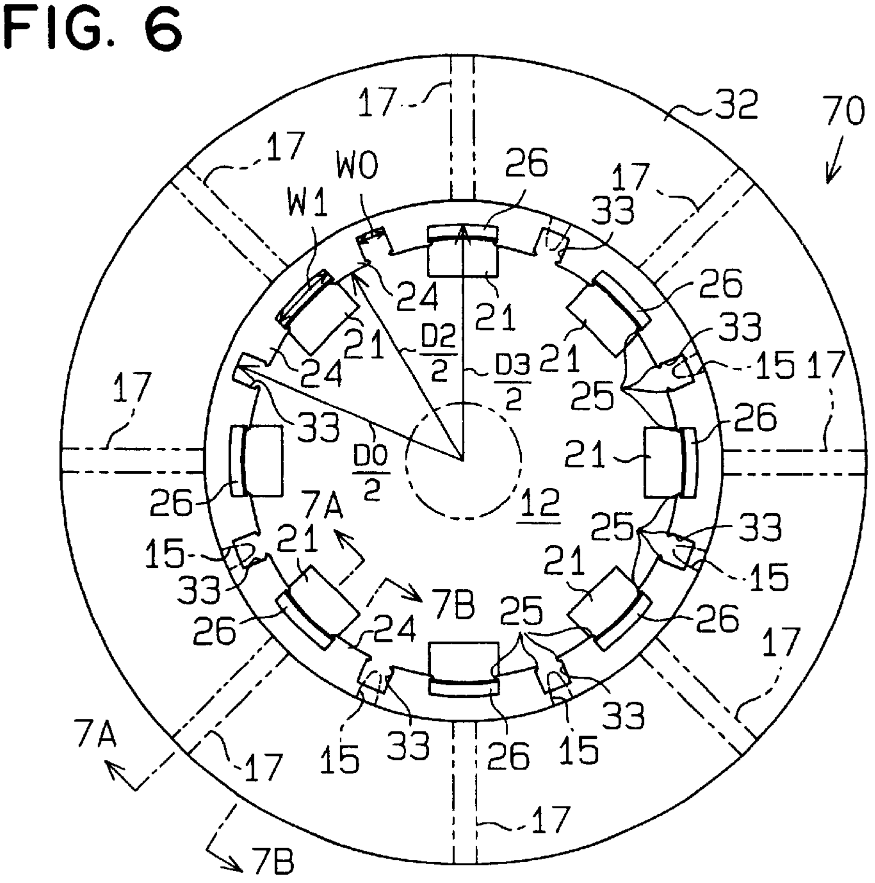
FIG. 7A
FIG. 7B
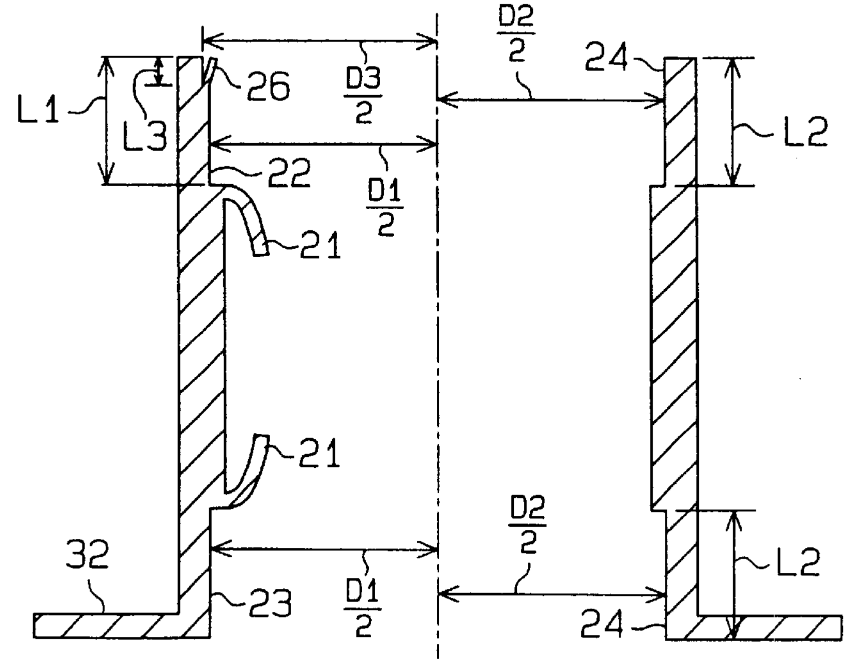

COMMUTATOR OF ROTARY ELECTRIC MACHINE AND METHOD OF MANUFACTURING THE SAME

CROSS REFERENCE TO RELATED APPLICATION

The present application is based on and claims priority from Japanese Patent Application Hei 10-322102 filed Nov. 12, 1998, the contents of which are incorporated herein by reference.

BACKGROUND OF THE INVENTION

1. Field of the Invention

The present invention relates to a commutator of a rotary electric machine such as a dc motor and a method of manufacturing the same and, particularly, a commutator segment.

2. Description of the Related Art

There are the following two types of commutators of electric motors according to rotation speed and other operating conditions of the motor: an assembled type commutator; and a mold type commutator. The assembled type commutator is an assembly of a plurality of commutator segments formed separately, an insulation body, and an annular insulation member. On the other hand, the mold type commutator is a mold unit of a cylindrical conductor member and an insulation body made of thermo-setting resin, which is machined to divide the cylindrical conductor member into commutator segments.

In a conventional mold type commutator, each commutator segment has a pair of inner claws at the inner surface thereof extending axially and radially inward to be secured to the insulation body. However, such a pair of inner claws is not sufficient to secure the commutator segment to the insulation body under severe operation conditions such as a high centrifugal force, a high rotation speed, and/or high tensile force. In manufacturing such a mold type commutator, a insulation body is molded with a cylindrical conductor member and machined, and commutator segments are cut out from the cylindrical conductor member. During such machining or cutting process, the outer periphery of the commutator segments may not form smooth surface because of thermal expansion or contraction.

SUMMARY OF THE INVENTION

A main object of the invention is to provide an improved commutator of a motor that is inexpensive and reliable.

Another object of the invention is to provide a reliable mold type commutator having an insulation body and a plurality of commutator segments which are tightly secured to the insulation body.

According to a preferred embodiment of the invention, a commutator of an electric motor includes a plurality of commutator segments and a cylindrical insulation body anchoring the plurality of commutator segments at the outer periphery thereof. Each of the commutator segments has a pair of wedge portions as well as a pair of inner claws. The pair of wedge portions is disposed axially outside and a circumferential side of each of said pair of inner claws so that each of the commutator segments holds the insulation body by both the pair of inner claws and the pair of wedge portions.

Therefore, the commutator segments and the insulation body are tightly bonded to each other over the entire length thereof and form a durable commutator operable under severe operation conditions such as a high centrifugal force, a high rotation speed, and/or high tensile force. Moreover, ribs are formed to maintain the distance between the adjacent wedge portions, thereby maintaining smooth surface after machining or cutting process. Dovetail portions are preferably formed at the edges of the wedge portions to increase resistance against thermal expansion or contraction of the insulation body. This prevents a brush noise and abnormal commutation caused by uneven surface of the commutator. Further, the inner claws, the wedge portions, the dovetail portions and ribs can be formed simultaneously by punches at a low cost.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 6 is a plan view of the cylindrical conductor member;

FIG. 7A is a cross sectional view of the cylindrical conductor member shown in FIG. 6 cut along line 7A—7A, and FIG. 7B is a cross sectional view of the cylindrical conductor member shown in FIG. 6 cut along line 7B—7B;

DETAILED DESCRIPTION OF THE PREFERRED EMBODIMENTS

Figure 1:
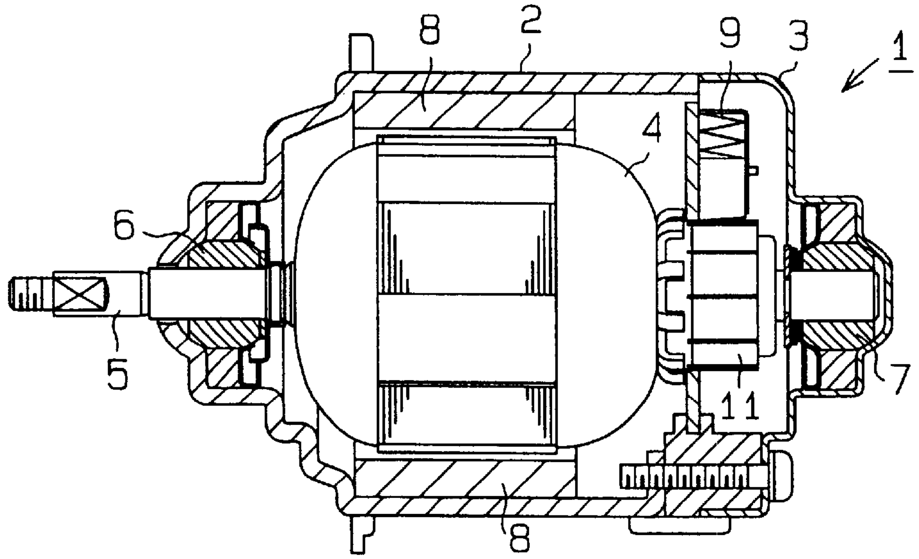
FIG. 1 is a cross-sectional side view of a motor having a commutator according to a first embodiment of the invention.

A commutator according to a first embodiment of the invention is described with reference to FIG. 1 through FIG. 4. A direct current motor (hereinafter referred to dc motor) 1 for a motor driven tool, a washer pump for a vehicle, and others includes housing 2, end-frame 3, armature 4 housed in the space defined by housing 2 and end-frame 3 and carried by shaft 5. Shaft 5 is rotatably supported by a pair of bearings at the opposite ends thereof. A plurality of permanent magnets 8 are fixed, at equal intervals in the circumferential direction, to the inner periphery of housing 2 to surround armature 4. Commutator 11 is press-fitted to an end of shaft 5 to have a pair of brushes 9 disposed in slidable contact therewith. Armature 4 rotates when armature 4 is supplied with electric current through the pair of brushes 9 and commutator 11.

Figure 2:
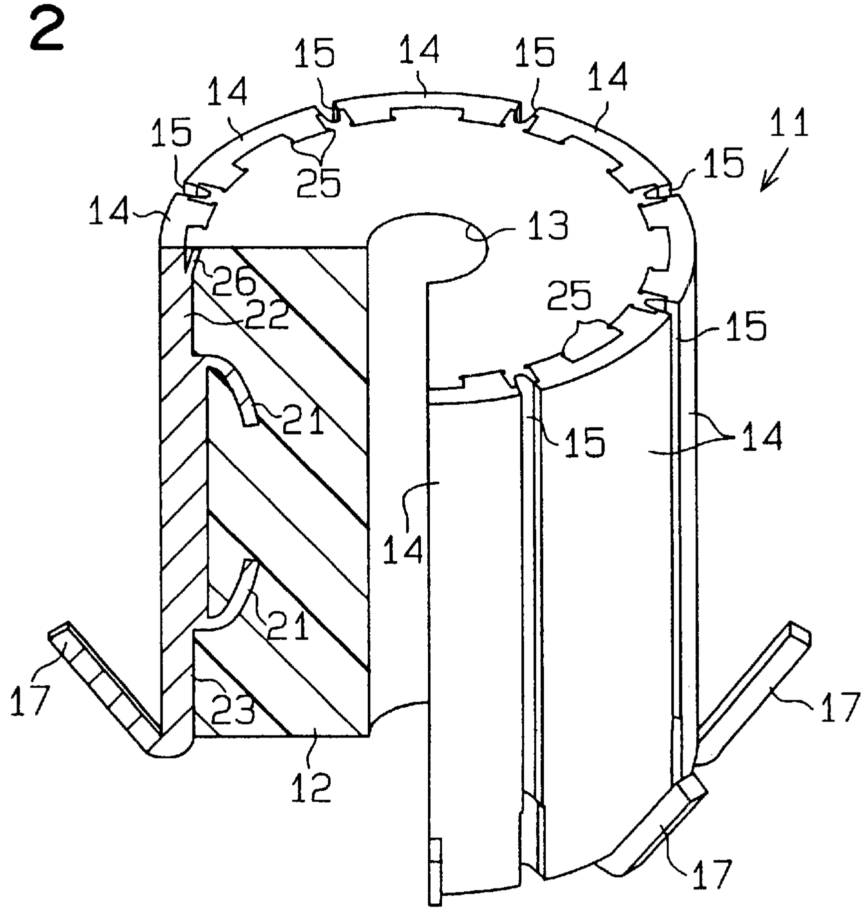
FIG. 2 is a partially cross-sectional perspective view of the commutator according to the first embodiment.

As shown in FIG. 2, commutator 11 has generally cylindrical insulation body 12. Insulation body 12 has shaft hole 13 to which shaft 5 is press-fitted and fixed.

Eight commutator segments 14 are fixed to the outer periphery of insulation body 12 at equal intervals in the circumferential direction. The number of commutator segments 14 varies to ten, twelve, sixteen, more or less according to circumstances of the motor to be applied to. Commutator segments 14 are molded together with insulation body 12. Commutator segments 14 are separated by an undercutting machine from each other to have slits 15 among them.

Each conductor segment 14 has connection claw 17 at an end of the outer periphery thereof extending radially outward and axially inward. Armature 4 has a plurality of coils, and each of leads extending from the plurality of coils is connected to one of connection claws 17.

Figure 3:
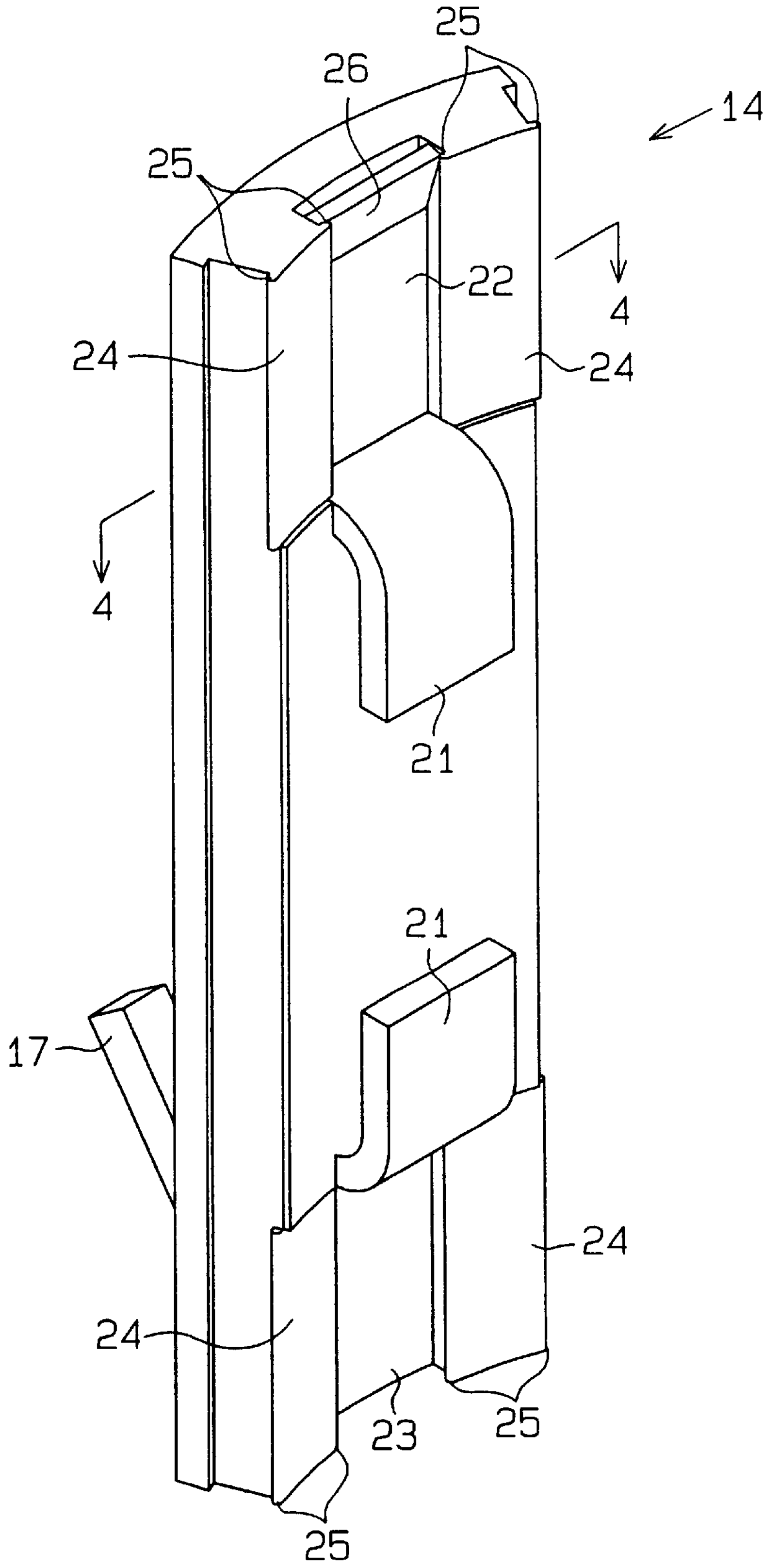
FIG. 3 is an enlarged perspective view of a commutator segment of the commutator according to the first embodiment.
Figure 4:
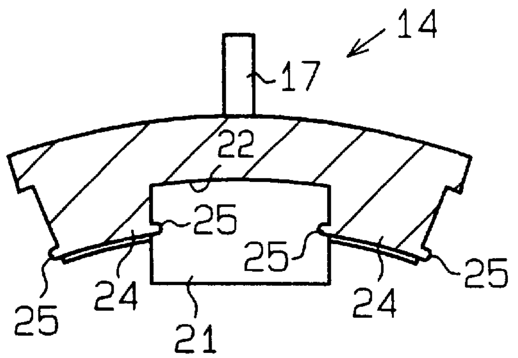
FIG. 4 is a cross-sectional view of the commutator segment cut along line 4—4 in FIG. 3.

Each commutator segment 14 has also a pair of inner claws 21*a* at circumferentially central portion and wedge portions 24 at circumferentially side portions of the inner periphery thereof as shown in FIG. 3. Each inner claw 21 is cut out from the portion of the inner periphery of commutator segment 14 between one of the axial ends and the central portion thereof to extend radially and axially inward, so that depression 22 or 23 is formed. Inner claws 21 are to hold insulation body 14 at the central portion of commutator segment. A pair of wedge portions 24 are formed at opposite sides of depression 22 or 23 to hold insulation body at the opposite axial ends of commutator segment 14. Wedge portion 24 has dovetail portion 25 projecting in the circumferential direction.

Ribs 26 are respectively cut out from the surfaces of depression 22 and 23 to incline radially inward to support circumferentially inside walls of wedge portions 24 as spacers. Thus, commutator segment 11 holds insulation body 12 by inner claws 21 and wedge portions 24 over the entire inner surface thereof. Commutator segments 11 are formed as illustrated in FIGS. 5–20.

Figure 5:
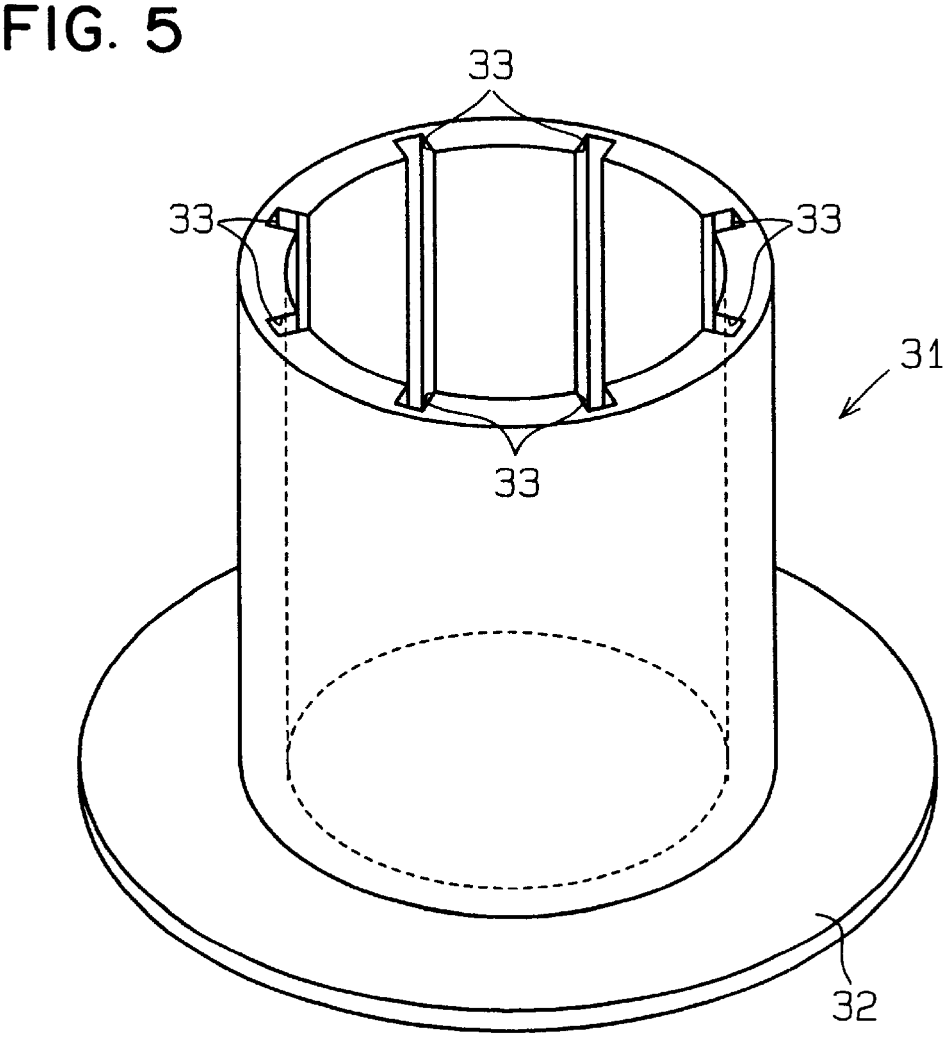
FIG. 5 is a perspective view of a cylindrical conductor member.

As shown in FIG. 5, a cylindrical conductor member 31 is press-formed from a copper pipe member to have inside diameter D2. Cylindrical conductor member 31 has flange 32, which is cut into connection claws 17, and eight coining grooves 33 formed at the inner periphery to define eight segment portions. Each of coining grooves 33 is formed at equal intervals to have inside diameter D0 and width W0 as shown in FIG. 6, so that slits 15 can be formed easily among commutator segments 14.

Figure 8:
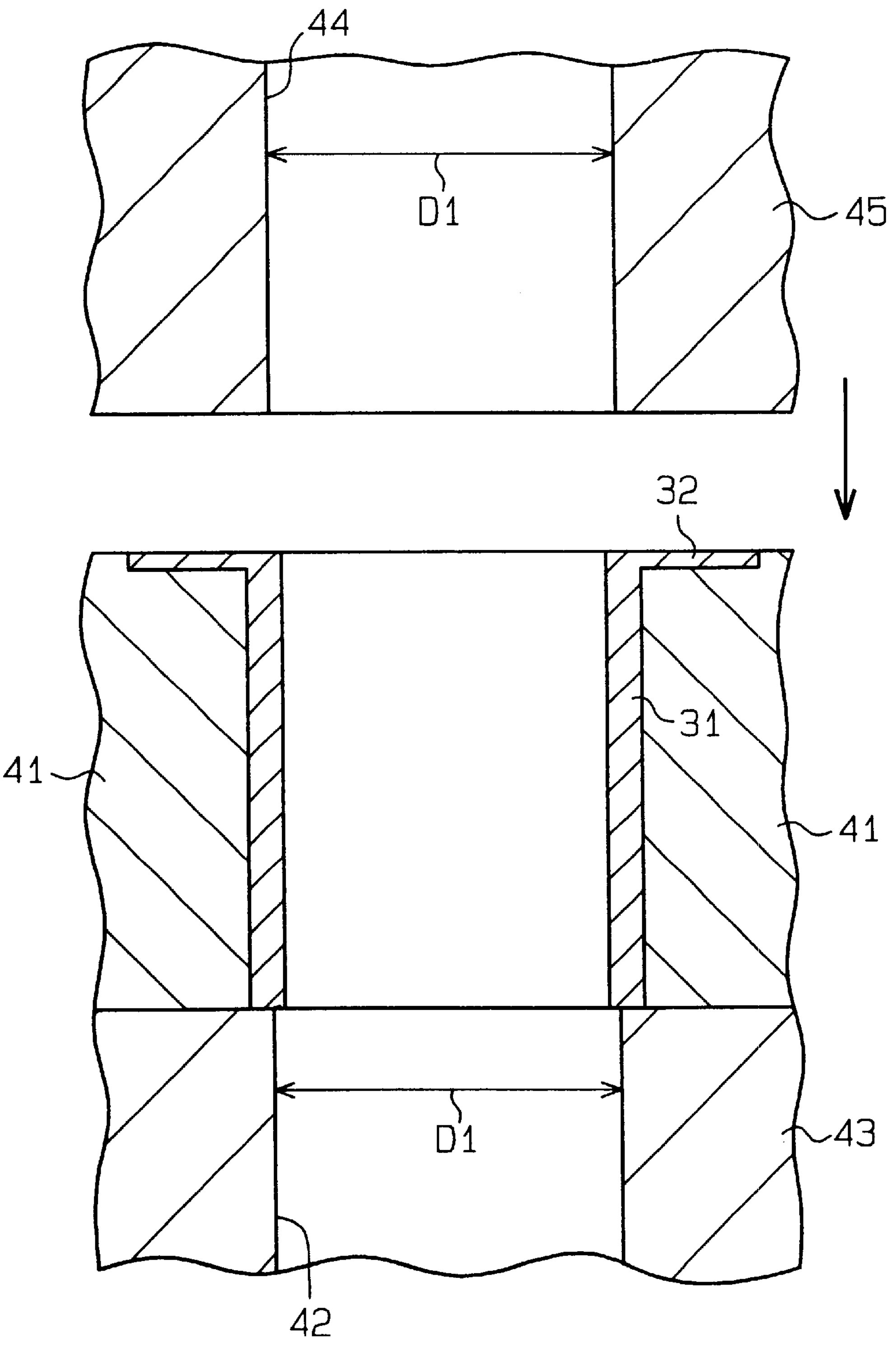
FIG. 8 is a schematic view illustrating a step of forming the commutator according to the first embodiment.

As shown in FIG. 8, cylindrical conductor member 31, with flange 32 being upside, is inserted into work holder 41 which has the inside contour complementary to the external shape of conductor member 31. Then, conductor member 31 in work holder 41 is coaxially put on guide hole 42 of lower die 43. Outside diameter D1 of guide hole 42 is larger than inside diameter of conductor member 31 and smaller than an outside diameter of the same. Then, upper die 45 having guide hole 44 of the same inside diameter D1 is coaxially put on conductor member 31 and work holder 41.

Figure 9:
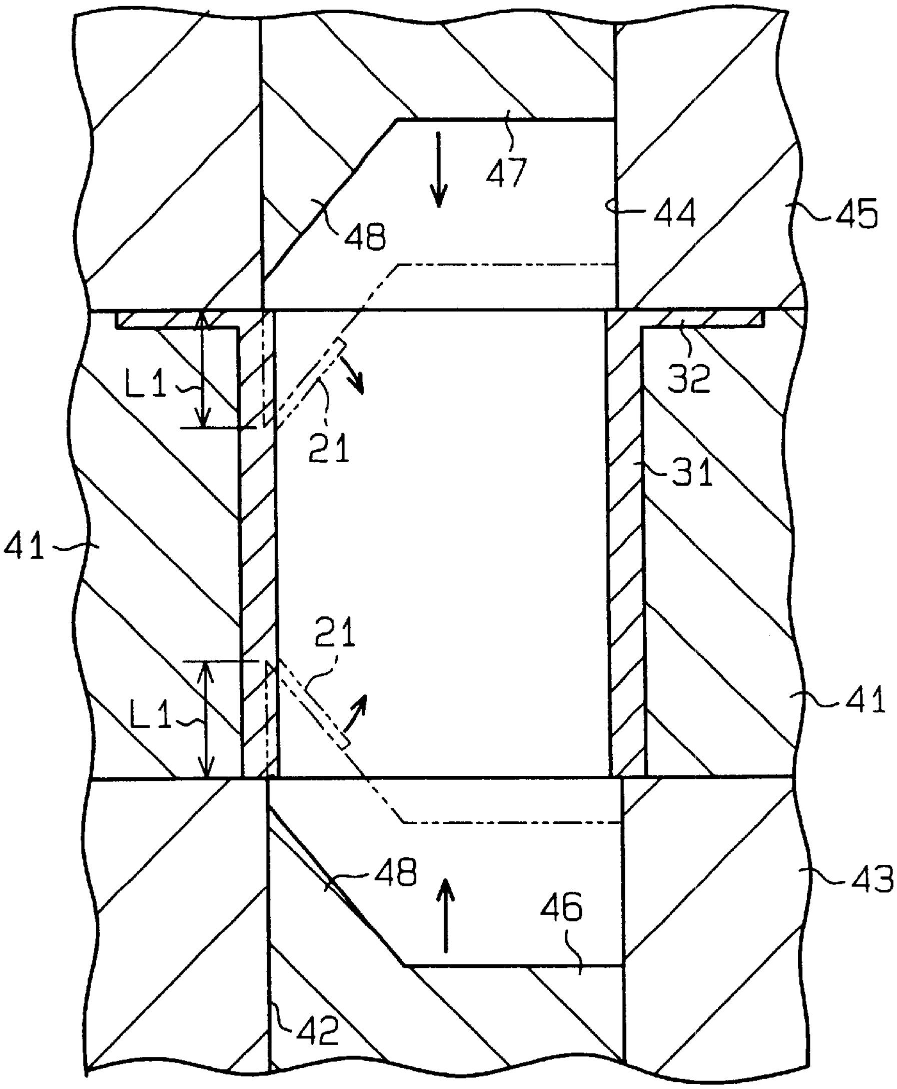
FIG. 9 is a schematic view illustrating a step of forming the commutator according to the first embodiment.
Figure 10:
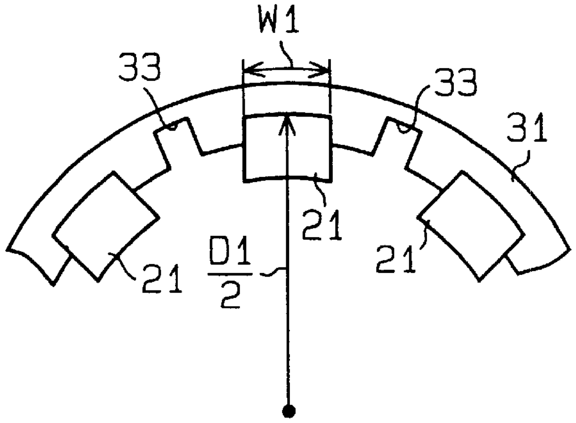
FIG. 10 is a schematic view illustrating a step of forming the commutator according to the first embodiment.
Figure 15:
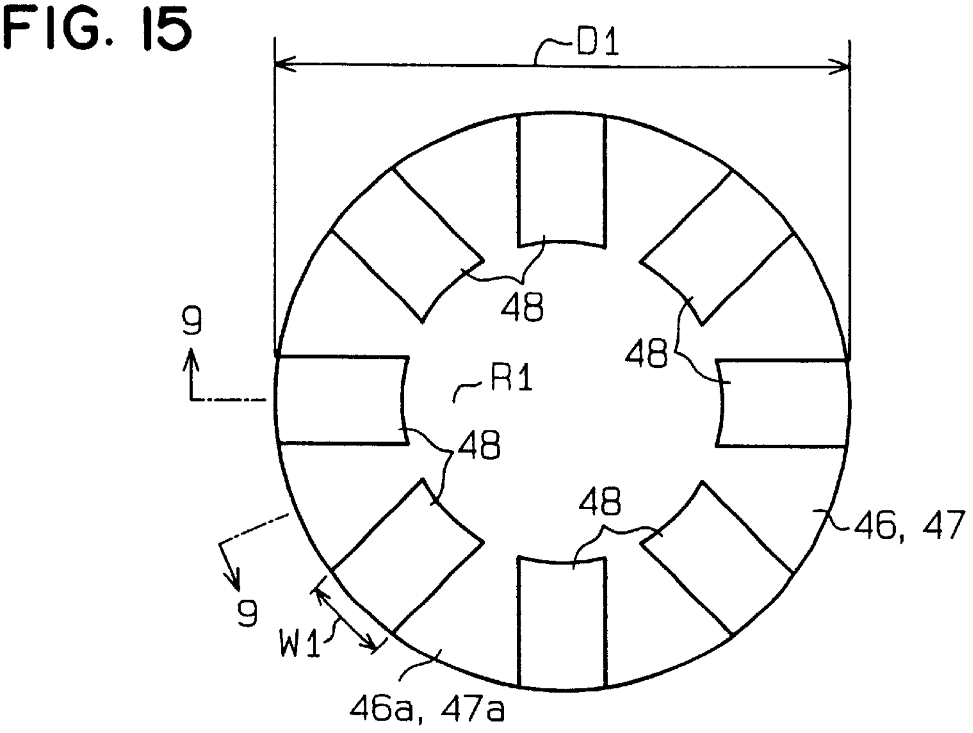
FIG. 15 is a schematic plan view of a punch.
Figure 16:
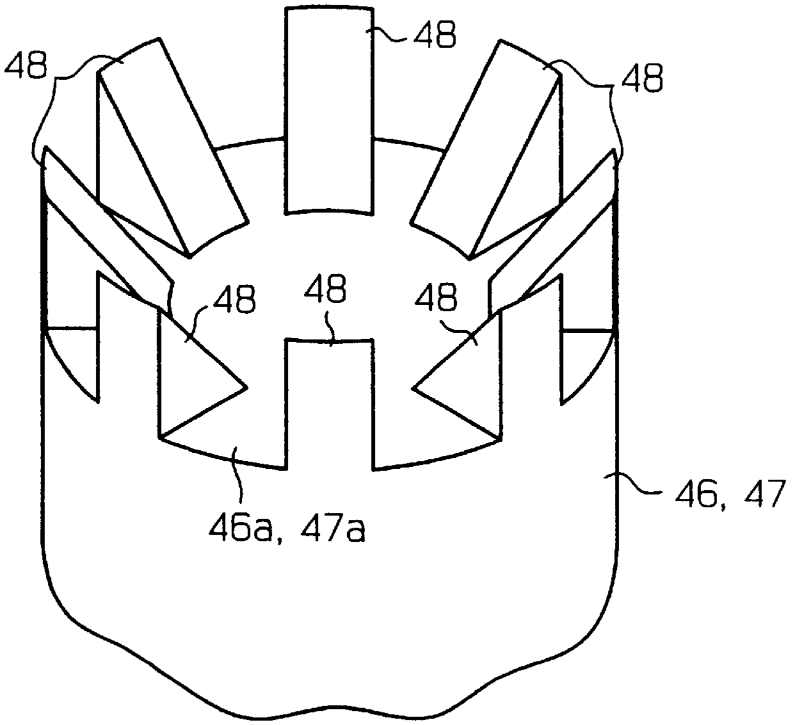
FIG. 16 is a schematic perspective view of the punch shown in FIG. 15.

As shown in FIG. 9, lower punch 46 and upper punch 47 are inserted into guide holes 42 and 44 to simultaneously form eight pairs of inner claws 21. As shown in FIGS. 15 and 16, lower and upper punches 46 and 47 have almost the same outside diameter as inside diameter D1 of guide holes 42 and 44. Each of punches 46 and 47 has eight triangular cutting edges 48 at an end thereof. As shown in FIGS. 6–10, lower and upper punches 46 and 47 are moved along guide holes 42 and 44 to carry the heads of cutting edges 48 distance L1 from the respective ends of conductor member 31, thereby cutting opposite end portions of the inner periphery of conductor member 32 to form inner claws 21 having width W1, depressions 22 and 23, and wedge portions 24.

Figure 11:
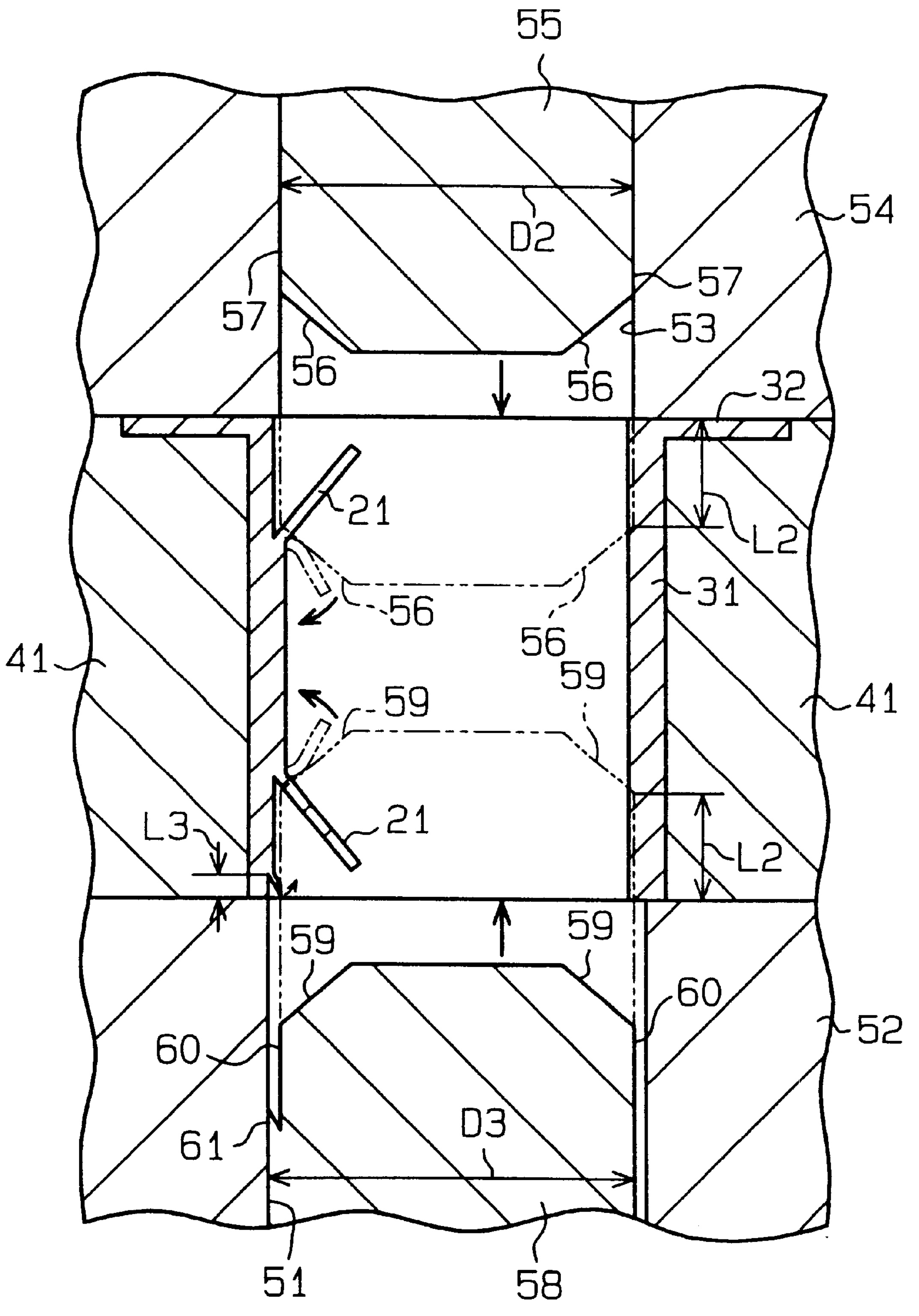
FIG. 11 is a schematic view illustrating a step of forming the commutator according to the first embodiment.

Thereafter, as shown in FIG. 11, conductor member 31 in work holder 41 is coaxially put on guide hole 51 of second lower die 52. The inside diameter D3 of guide hole 51 is a little larger than inside diameter D1 of guide hole 42 or 44. Second upper die 54 is also coaxially put on conductor member 31 and work holder 41. The inside diameter D2 of guide hole 53 is a little larger than inside diameter of conductor member 31.

Figure 12:
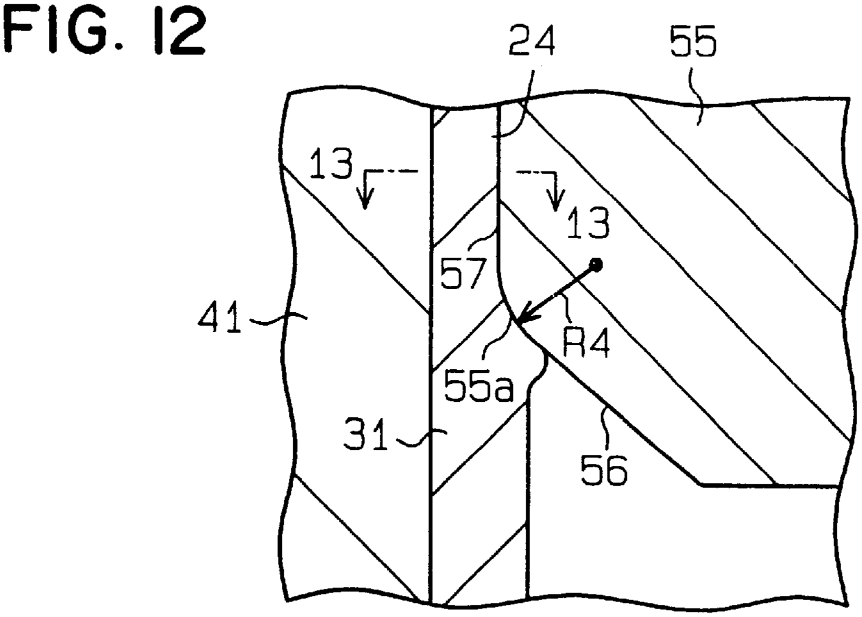
FIG. 12 is a schematic view illustrating a step of forming the commutator according to the first embodiment.
Figure 13:
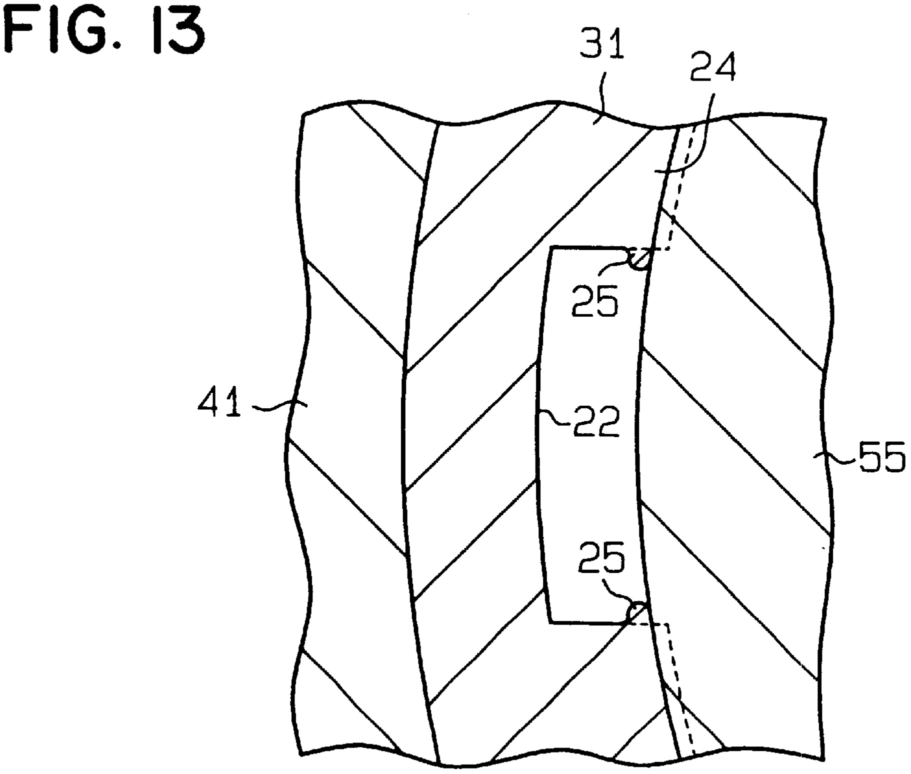
FIG. 13 is a cross-sectional view of the portion shown in FIG. 12 cut along line 13—13.
Figure 17:
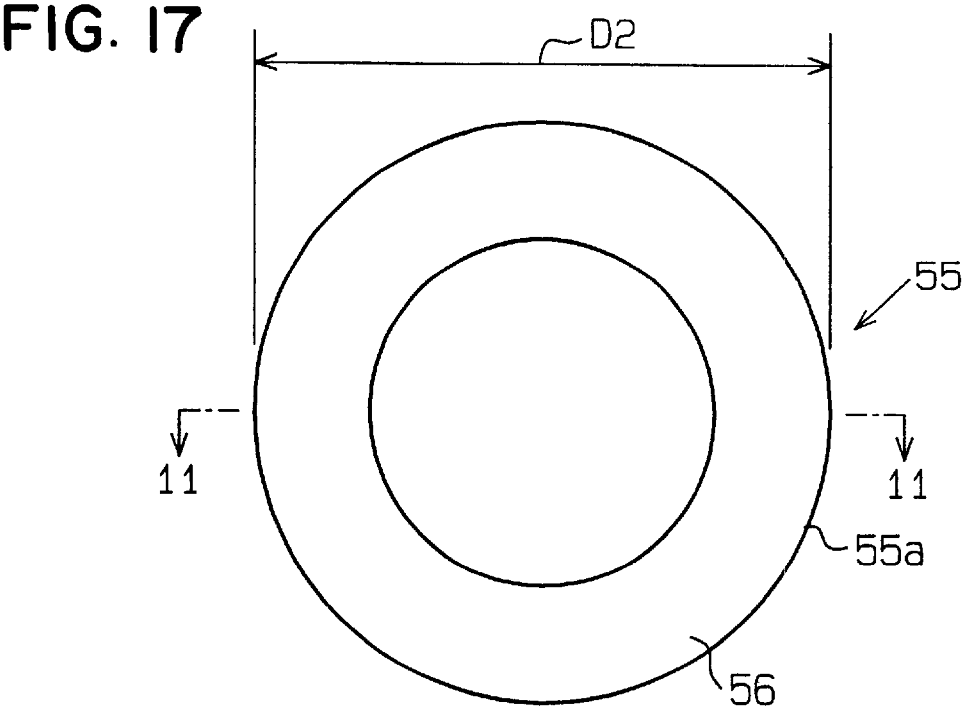
FIG. 17 is a schematic plan view of a punch.
Figure 18:
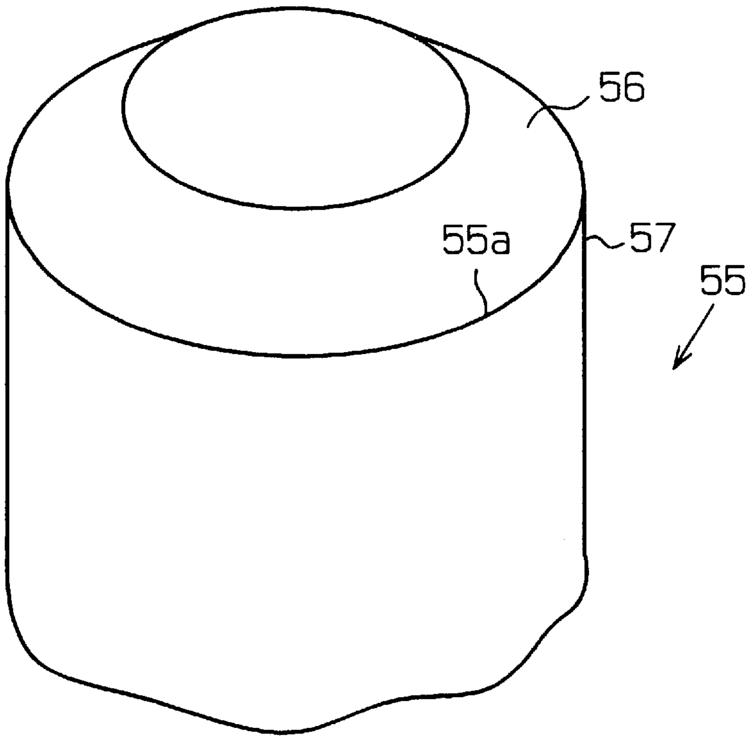
FIG. 18 is a schematic perspective view of the punch.

Thus, second upper punch 55 is inserted into guide hole 53 to bend inner claw 21 axially inside and to form wedge portions 25. As shown in FIGS. 17 and 18, second upper punch 55 has the same outside diameter as inside diameter D2 of second upper die 54 and tapering surface 56 at one end thereof. As shown in FIG. 12, tapering surface 56 merges smooth with outer periphery 57 of second upper punch 55 via round corner 55*a* having radius R4. As shown in FIG. 11, second upper punch 55 moves along guide hole 53 to carry round corner 55*a* distance L2 from the upper end of conductor member 31, thereby bending inner craw 21 axially inward. Wedge portions 24 are simultaneously press-formed by round corner 55*a* to have its length L2 and to form dovetails 25.

Figure 19:
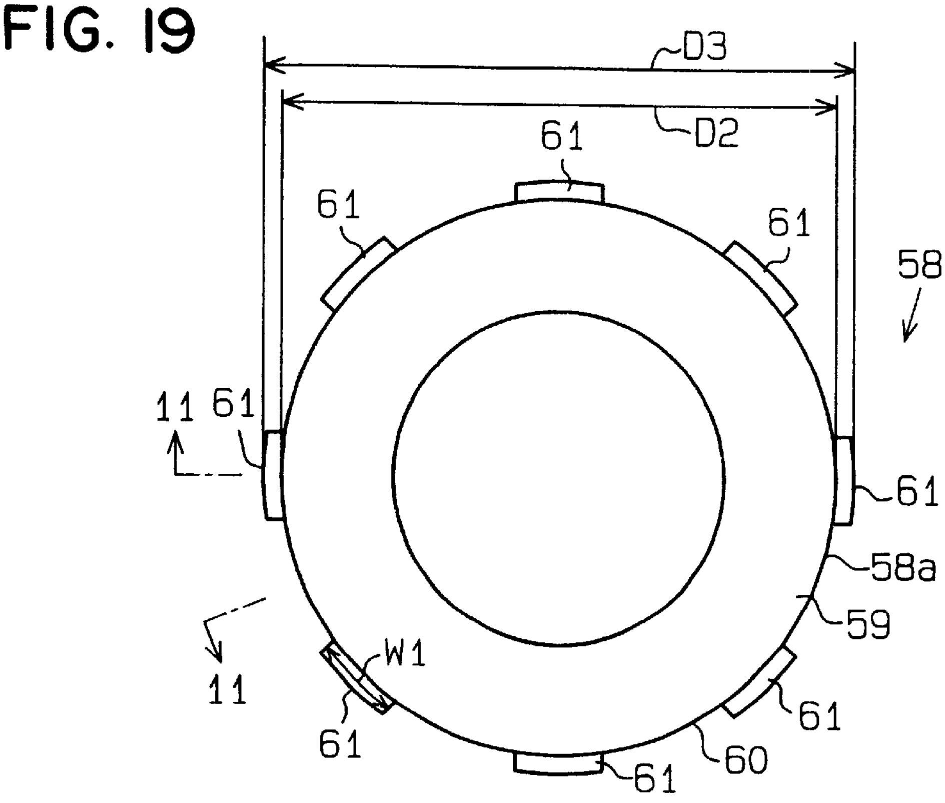
FIG. 19 is a schematic plan view of a punch.
Figure 20:
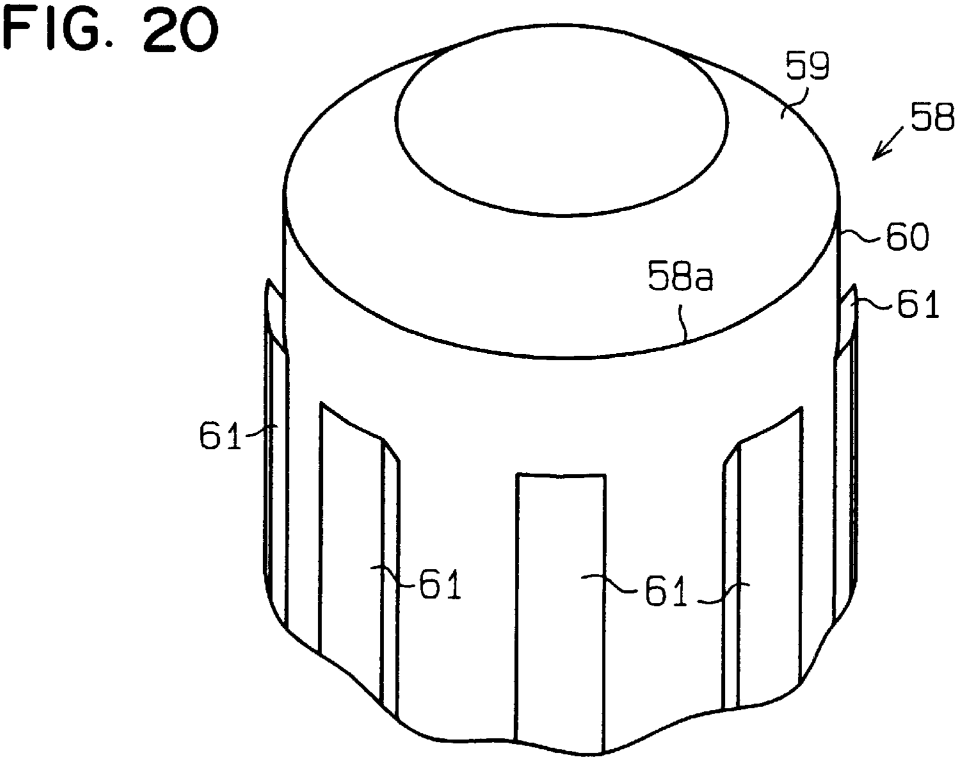
FIG. 20 is a schematic perspective view of the punch.

Second lower punch 58 is also inserted into guide hole 51 to bend inner claw 21 axially inward, form dovetails 25 and cut out rib 26 from depressions 23. As shown in FIGS. 19 and 20, second lower punch 58 has cylindrical surface 60 having the same outside diameter as inside diameter D2 of second upper punch 55, tapering surface 59 and round corner 58*a*, which are the same as second upper punch 55. Second lower punch 58 also has eight cutting edges 61 projecting at equal angular intervals from cylindrical surface 60, each of which has the same width W1 as cutting edge 48 of punch 46 or 47. Each cutting edge 61 has a tapering head which is a little duller than cutting edges 48.

Figure 14:
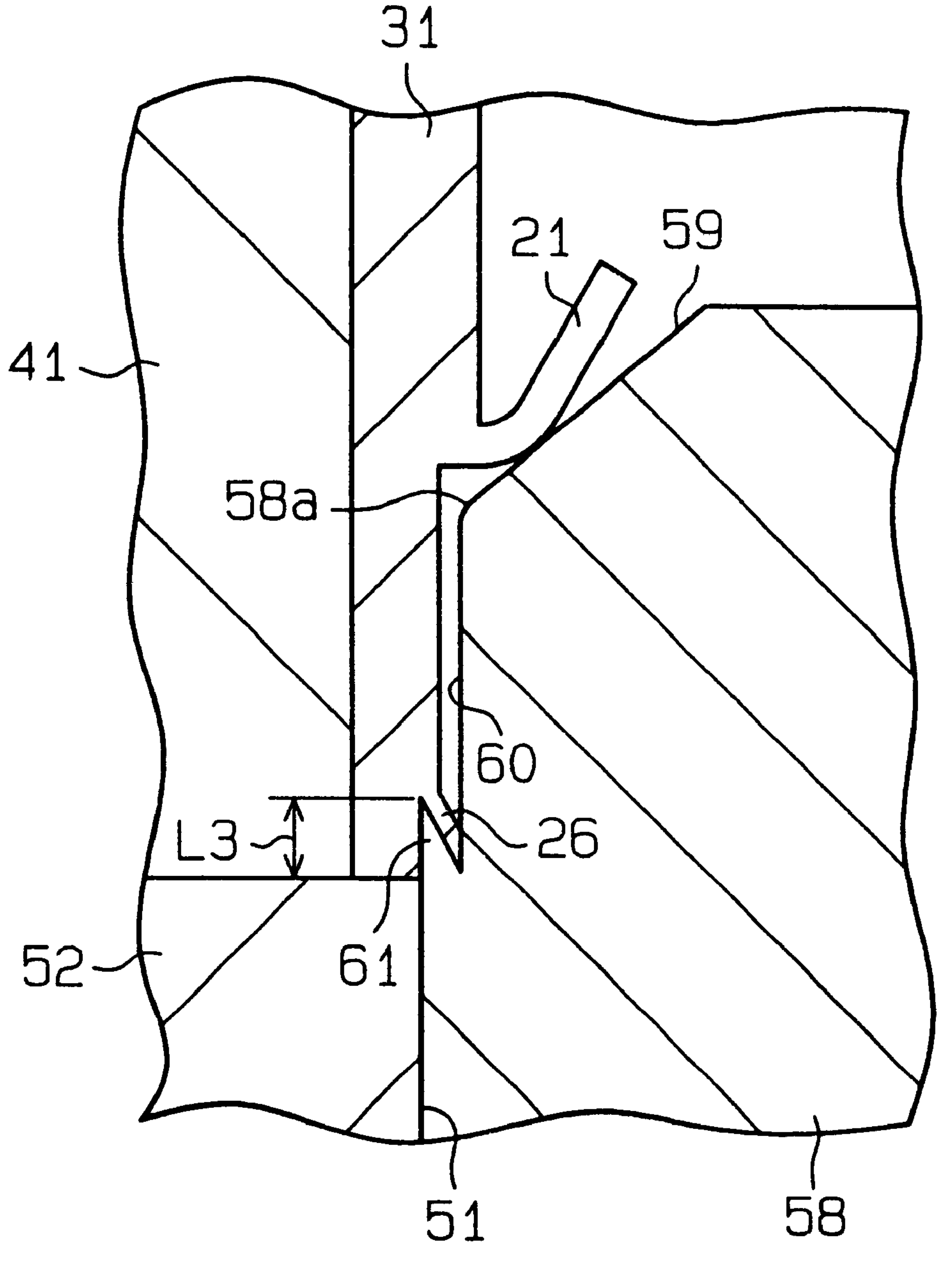
FIG. 14 is a schematic view illustrating a step of forming the commutator according to the first embodiment.

As shown in FIG. 11, second lower punch 58 moves along guide hole 51 to carry round corner 58*a* distance L2 from the lower end of conductor member 31, thereby bending inner craw 21 axially inward. Wedge portions 24 are simultaneously press-formed by round corner 55*a* to form dovetails 25 having length L2. As shown in FIG. 14, rib 26 is cut out from the surface of depression 23 to have length L3 and the same width W1 as inner claw 21. Thus, conductor member 31 is formed into conductor member 70 as shown in FIG. 6.

Then, insulation body 12 is molded within conductor member 70 to form a unit member. Insulation body 12 is tightly secured to conductor member 70 by inner claws 21 and wedge portions 24 having dovetail portions 25. Thereafter, the outer periphery of the unit member is cut along coining grooves 33 to form commutator segments 14 separated by slits 15 as shown in FIG. 2. Flange 32 is, thereafter, cut into eight connection claws 17, which are bent axially inward.

Figure 22:
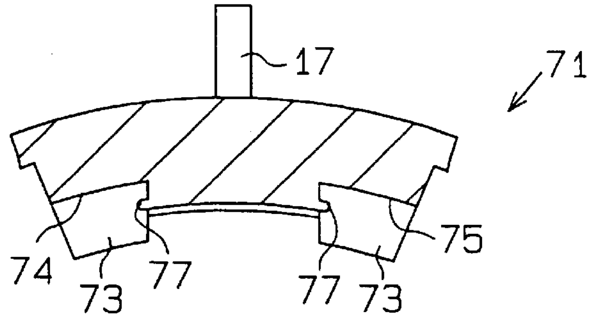
FIG. 22 is a cross-sectional view of the commutator segment shown in FIG. 21 cut along line 22—22.
Figure 23:
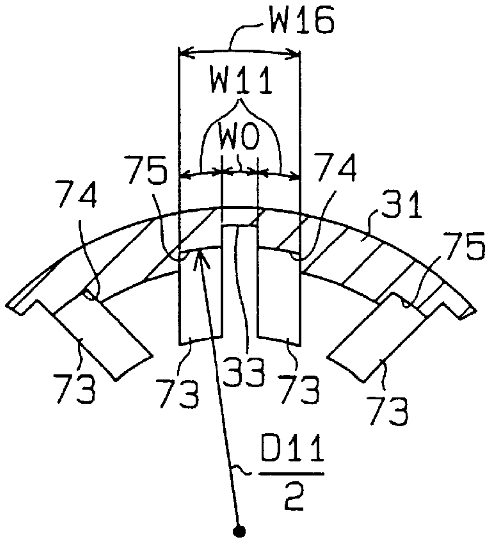
FIG. 23 is a schematic view illustrating a step of forming a commutator segment according to the second embodiment.

A commutator according to a second embodiment of the invention is described with reference to FIGS. 21–23. In the second embodiment, each commutator segment 71 has two pairs of inner claws 73 respectively formed at opposite circumferential sides and a pair of wedge portions 76 is formed at the circumferentially central portions between depressions 74, 75 or between inner claws 17.

Figure 21:
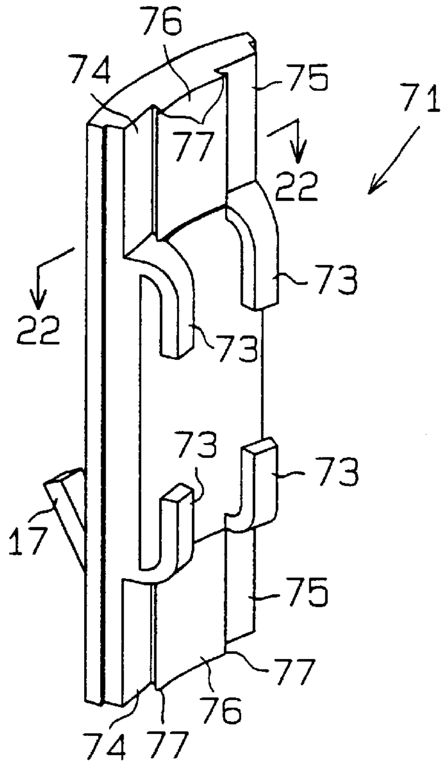
FIG. 21 is a perspective view of a commutator segment according to a second embodiment of the invention.

As shown in FIG. 21, two pairs of inner claws 73 are cut out from circumferentially opposite sides of commutator segment 71, so that a pair of wedge portions 76 is formed at axially opposite ends between two pairs of depressions 74 and 75 that are formed after the pairs of inner claws 73 are cut out.

Each wedge portion 76 has a dovetail portion 77 at the projecting edge thereof to effectively hold insulation body 12. Accordingly, each commutator segment 71 effectively holds insulation body 12 by two pairs of infer claws and wedge portions 76 evenly over the entire length thereof.

Inner claws 73 are cut out and raised by a pair of cylindrical punches which is similar in shaped to punches 46 and 47 shown in FIGS. 15 and 16. Each of punches 46 and 47 has outside diameter D11 smaller than the outside diameter of commutator segment 71 and larger than the inside diameter thereof and also has eight cutting edges respectively positioned at coining grooves 33 between two commutator segments 71 adjacent to each other. Each of the cutting edges has circumferential width W16 that is a sum of width W0 of coining groove 33 and the double of inner claw width W11. Thus, each cutting edge of the pair of punches simultaneously forms inner claws 73, depressions 74, 75, and wedge portions 76 at the opposite sides of coining groove 33 of two commutator segments 71 adjacent to each other.

Cylindrical conductor member 31 is thereafter shaped to have a little larger outside diameter than the inside diameter of commutator segments 71. An upper punch, which is similar to second upper punch 55 shown in FIGS. 17 and 18, is inserted from the upper end of conductor member 31 to bend inner claw axially inward and form dovetail portions 77.

Figure 24:
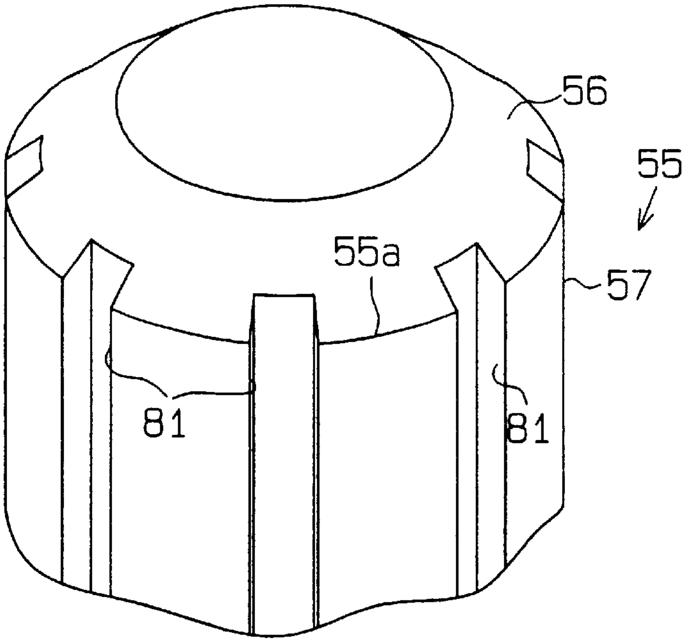
FIG. 24 is a schematic perspective view illustrating a variation of one of the punch.
Figure 25:
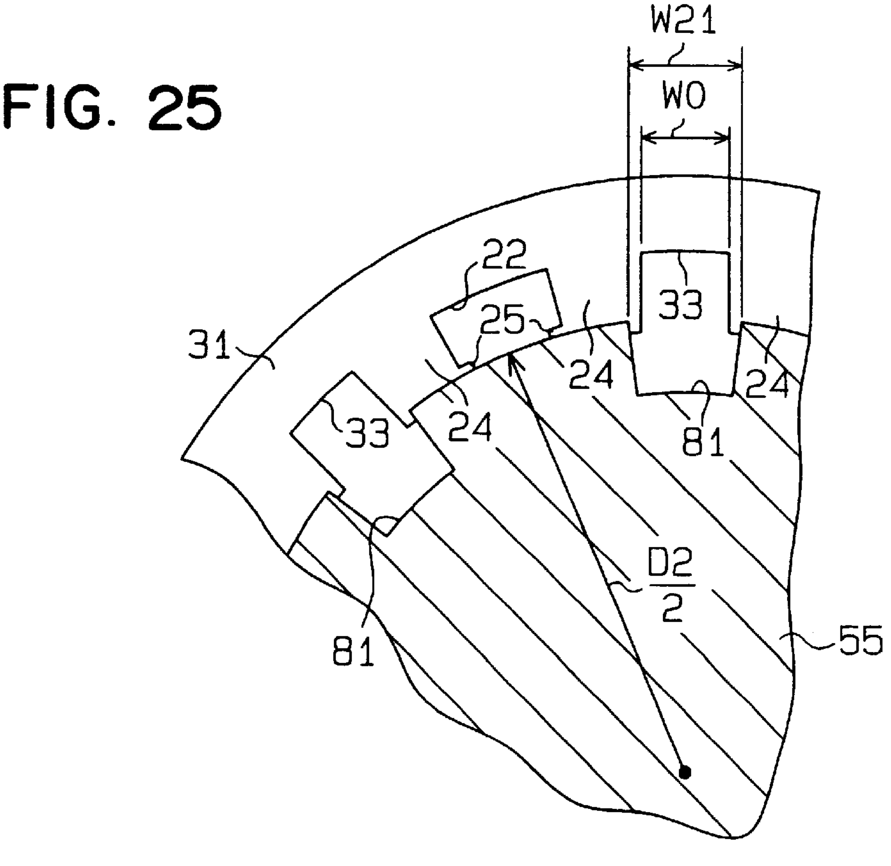
FIG. 25 is a schematic view illustrating a step of forming wedge portions of the commutator segment according to the second embodiment.

In the first embodiment, second upper punch 55 can have eight slits 81 as shown in FIGS. 24 and 25 to allow brims of wedge portions 24 flow therein when the outer periphery of wedge portions 24 is pressed and squeezed. Each of slits 81 has a little larger circumferential width W21 than the circumferential width W0 of coining groove 33, so that a half of dovetail portion or hook portion 25 is not formed on the side of wedge portion 24 of one of commutator segment 14 opposite to another adjacent thereto. This not only prevents separate commutator segments 14 from contacting with each other but also increases flow of the brims of wedge portions 24 in one direction, thereby, to increase the size of hook portion 25. Second lower punch 58 can have the same slits 81 on outer periphery 60 thereof to provide the same function and effect.

In the first embodiment, the circumferential width W1 of rib 26 can be changed. Ribs 26 can be cut out from depressions 22 in addition to depressions 23. Ribs 26 can be omitted under the circumstances of the motor to be operated.

In the first embodiment, the step of cutting out ribs 26 from depressions 23 can be separated from one of the step of bending inner claws 21 and the step of press-forming dovetails 25. The step of bending inner claws 21 and the step of press-forming dovetails 25 can be also separated from each other.

Insulation body 12 made of a thermosetting resin can be substituted by any other resin suitable for the insulation body.

Cylindrical conductor member 31 can be formed from a conductor plate instead of a ring member. The commutator according to the embodiments can be applied to various electric rotary machines other than the dc motor, such as a universal motor or ac-dc combined motor.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A commutator of a rotary electric machine comprising:

a plurality of commutator segments formed from a pipe member; and a cylindrical insulation body anchoring said plurality of commutator segments at an outer periphery thereof; wherein each of said commutator segments has:

a pair of inner claws disposed at an axially central portion of an inner surface thereof respectively extending radially and axially inward, and a pair of wedge portions disposed at an axially outside and a circumferential side of said pair of inner claws, each of said wedge portions having dove tail portions extending in circumferential directions.

2. A motor having a commutator that is claimed in claim 1.

3. A commutator of a rotary electric machine comprising:

a plurality of commutator segments made from a pipe member; and a cylindrical insulation body anchoring said plurality of commutator segments at an outer periphery thereof; wherein each of said commutator segments has:

a pair of inner claws disposed at opposite portions of inner surface thereof respectively extending radially and axially inward, and a pair of wedge portions disposed axially outside and circumferentially opposite sides of each of said pair of inner claws, each of said wedge portions having dove tail portions extending in circumferential directions.

4. The commutator as claimed in claim 3, further comprising a rib member disposed between said pair of wedge portion for circumferentially supporting the same.

5. A commutator segment for a commutator of a rotary electric machine, said commutator seqment comprising:

at least a pair of jnner claws respectively cut out from axially opposite end portions of said commutator segment at an inner surface thereof to respectively extend radially and axially inward, and at least a pair of wedge portions respectively disposed adjacent to said axially opposite end portions, wherein said wedge portions have dovetail portions extending in circumferential directions from inner edges thereof.

6. The commutator segment as claimed in claim 5, wherein said pair of inner claws is disposed at each of said circumferentially opposite sides of said commutator segment, and said pair of wedge portions are disposed between said two pairs of inner claws.

7. The commutator segment as claimed in claim 5, wherein said pair of wedge portions is disposed at each of circumferentially opposite sides of said commutator segment, and said pair inner claws is disposed between said two pairs of wedge portions.

8. A commutator of a rotary electric machine comprising:

a plurality of commutator segments formed from a pipe member; and a cylindrical insulation body anchoring said plurality of commutator segments at an outer periphery thereof;

wherein each of said commutator segments has:

a pair of inner claws disposed at circumferentially opposite sides of an inner surface thereof respectively extending radially and axially inward, and a wedge portion disposed at a portion axially outside and between said pair of inner claws, said wedge portion having dove tail portions extending in circumferential directions.

9. A commutator of a rotary electric machine having brushes, said commutator comprising:

a plurality of circumferentially disposed commutator segments providing an outer periphery to be in slidable contact with said brushes and an inner periphery, each of said commutator segments having a pair of inner claws extending radially inside and in axially opposite direction6 from said inner periphery, a pair of depressions formed at axially outside said pair of claws and a pair of wedge portions each of which is disposed at a circumferential side of said pair of depressions, each of said wedge portions having dove tail portions projecting in circumferential directions; and a cylindrical insulation body disposed radially inside said commutator segments to anchor said commutator segments by said inner claws and said wedge portions.

10. The commutator as claimed in claim 9, further comprising a rib member disposed in said depression to support one of said wedge portions.

11. A commutator of a rotary electric machine having brushes, said commutator comprising:

a plurality of circumferentially disposed commutator segments providing an outer periphery to be in slidable contact with said brushes and an inner periphery, each of said commutator segments having a pair of inner claws extending radially inside and in axially opposite directions from said inner periphery, a pair of depressions formed at axially outside said pair of claws and two pairs of wedge portions each of which is disposed at a circumferential side of said pair of depressions, each of said wedge portions having a dove tail portions extending in circumferential directions; and a cylindrical insulation body disposed radially inside said commutator segments to anchor said commutator segments by said inner claws and said wedge portions.

12. A commutator of a rotary electric machine having brushes, said commutator comprising:

a plurality of circumferentially disposed commutator segments providing an outer periphery to be in slidable contact with said brushes and an inner periphery, each of said commutator segments having two pairs of inner claws extending radially inside and in axially opposite directions from said inner periphery, two pairs of depressions each of which is formed at axially outside said pair of inner claws and a pair of wedge portions disposed between said pair of depressions, each of said wedge portions having dove tail portions extending in circumferential directions; and a cylindrical insulation body disposed radially inside said commutator segments to anchor said commutator segments by said inner claws and said wedge portions.

* * * * *